Patented Sept. 1, 1953

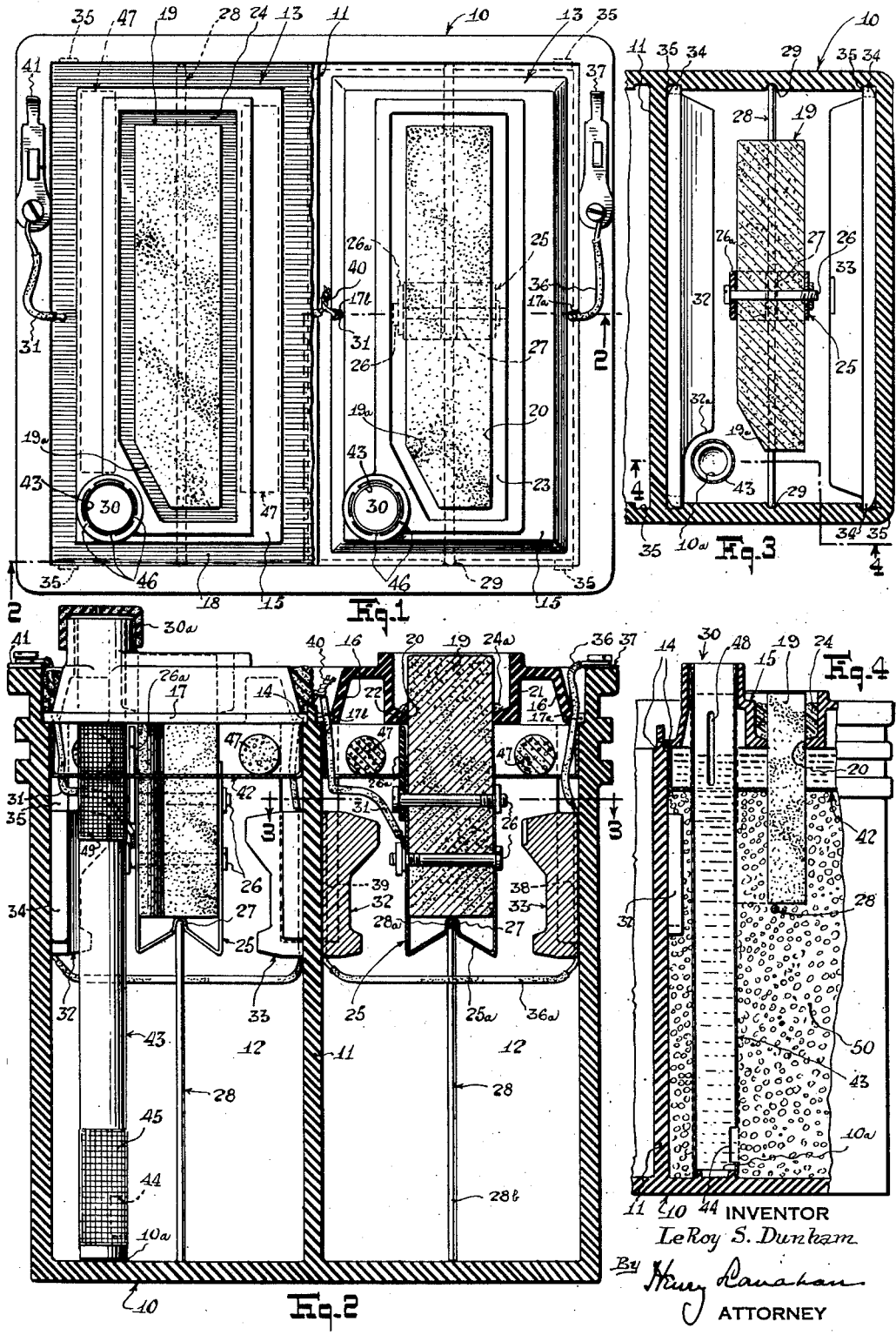

2,650,947

UNITED STATES PATENT OFFICE 2,650,947

PRIMARY BATTERY

Le Roy S. Dunham, East Orange, N. J., assignor to Thomas A. Edison, Incorporated, West Orange, N. J., a corporation of New Jersey Application March 24, 1950, Serial No. 151,743

7 Claims. (Cl. 136—164)

This invention relates to structural improvements in and to a novel construction of a primary battery of the type shown and claimed in the Dunham et al. Patent No. 2,450,472 issued October 5, 1948.

A distinctive feature of the type of primary cell disclosed in this Patent No. 2,450,472 is in substantially filling the free space in the cell for electrolyte with a granular electrolyte-regenerating material and in providing at least a major portion of the electrolyte solution within this granular mass, the advantage of this arrangement being to increase substantially the cell capacity. Deferred-action cells of this type are supplied initially with a dry granular mix of this regenerating material and of a water-soluble electrolyte ingredient, and are activated for use by merely adding water to the cell. There are special problems encountered though in introducing the water, or other activating liquid, so that washdown of the electrolyte ingredient will not occur to reduce the strength of the electrolyte solution in the upper part of the cell. According to the present invention, however, there is comprehended the novel combination of a filling tube with such granular mix, which tube extends to the bottom of the cell to introduce the water into the lower part of the mix, from where the water will rise as an ascending column as water is added to the tube. In this combination, the filling tube not only prevents washdown of the water-soluble electrolyte ingredient, but even causes some upward displacement of that ingredient as the water is added.

An object of my invention is to provide a practical and dependable form of deferred-action cell of the type above-mentioned which has a filling means adapted to insure proper activation of the cell in the field.

It is another object to provide a filling tube which will not only introduce the water into the bottom of the cell but which is also adapted (1) to equalize the water level in the tube with the solution level in the cell to permit observation of the true solution level through the filler opening, (2) to direct the water into the upper portion of the cell only when the lower portion of the cell has been filled, and (3) to enable the flowing of a layer of oil on the electrolyte solution after the cell is activated.

A further feature is in providing simple gas-venting means between the filler tube and case-filler opening, which venting means is kept from being clogged by the entrant water in the filler opening during the filling operation.

Another object is to provide a free space in the cell above the granular mix and to fill the cell with electrolyte solution to a level between the mix and the lid of the case.

It is another object to provide a liquid-pervious barrier to define the uppermost level of the mix, and to provide a mass of pure electrolyte ingredient above the barrier to form an electrolyte solution of suitable strength in that region when water is added.

Another object is to provide in a primary cell a simple, economical and sturdy support structure for fragile air-depolarizing cathodes.

A still further object is to provide such a support structure which forms also an effective low-resistance current connection to the cathode body.

These and other objects and features of the invention will be apparent from the following description and the appended claims.

In the description of my invention reference is had to the accompanying drawings, of which:

Figure 1 is a top plan view of a two-cell primary battery constructed according to my invention, but showing the right cell as it appears before the elements are sealed in place;

Figure 2 is a vertical sectional view taken substantially on the line 2—2 of Figure 1;

Figure 3 is a fractional section of one cell taken substantially on the line 3—3 of Figure 2; and Figure 4 is a fractional section taken substantially on the line 4—4 of Figure 3.

The present invention has been embodied and is herein illustrated in terms of primary cells having air-depolarizing cathodes, zinc anodes and an alkaline electrolyte. It is to be understood, however, that no unnecessary limitation of the invention to cells of this type is intended since certain features of the invention may be used to advantage, either singly or in combination, in other types of primary batteries.

The battery shown in the accompanying drawings comprises a case 10 having a rectangular shape as viewed from the top and sides. This case has a centrally-located partition wall 11 forming two compartments 12 for respective identical cells 13. The interior walls of the case are recessed near the top to form ledges 14 on which are seated respective identical lids 15 for the compartments 12. The case 10 and lids 15 are preferably molded from hard rubber or other suitable material. Each lid is made relatively deep and so formed as to have a depending outwardly-flared skirt 16 provided with an outwardly-extending rim 17 that seats on the ledges just mentioned. Between the skirts 16 and side walls of the case there are narrow channels in which is placed a sealing compound 18 such as pitch. The partition wall 11 terminates below the level of the top edge of the case, leaving a single wide channel between the adjacent skirts of the two lids, which channel is also filled with the sealing compound 18.

The present invention resides particularly in the construction and arrangement of the individual cells—the two-cell arrangement being shown only to depict a commercial battery adapted especially for railroad services—wherefore the cells are now described in detail.

Each cell comprises an air-depolarizing cathode 19 of a carbonaceous material such as well known in the art. The cathode has, for example, the shape of a rectangular parallelepiped except for a truncation of one corner at 19a (Figures 1 and 3) to provide clearance space below a filler opening 30 in the lid closed by a vented cap 30a. The cathode is positioned midway between the side walls in the upper portion of the cell, and protrudes through a central opening 20 in the lid 15. This opening is bounded by a flange 21 which is spaced from the side walls of the cathode. The flange extends partially above the lid to the level of the top face of the cathode and extends downwardly from the lid to the level of the rim 17 aforementioned. At the lower end of the flange there is an inwardly-projecting rim 22 which embraces closely the side walls of the cathode. Thus, between the cathode and flange 21 there is a narrow channel space 23. This space is filled with a sealing compound 24 such as pitch. The sealing compound is poured into place while in a heated mobile condition, and in order that it will not run through the narrow clearance space between the rim 22 and cathode before being cooled, the bottom part of the channel 23 is first filled with a fine sand 24a as indicated in Figure 2.

A support structure for the cathode comprises a U-shaped metal strap 25 which embraces the lower portion of the cathode and is secured thereto by two bolts 26. The two side legs of this strap depend below the bottom face of the cathode and are bridged by a portion 25a of the strap in the form of an inverted V (Figure 2). At the apex of the V there is a groove 27 the innermost wall of which bears against the bottom face of the cathode. Below the cathode there is an inverted U-shaped support 28, made for instance from metal rod stock, the cross member 28a of which engages the groove 27. The opposite legs 28b of this support stand on the bottom wall of the case and engage respective vertical grooves 29 in opposite side walls of the case (Figure 3), the grooves extending through the top edge of the case to allow the support to be installed easily before the lid 15 and cathode are mounted in place. These grooved side walls serve to hold the support member 28 firmly in a vertical position. In turn, since the strap 25 is secured firmly to the cathode and is located positively with respect to the support, it follows that the cathode is supported firmly in the case.

An upstanding locating tab 26a of insulating material is secured by one of the bolts 26 against one side of the cathode 19. The upper end of this tab terminates just short of the bottom face of the rim 22 when the cathode is in mounted position. In other words, until the cathode is correctly positioned, the lid will not close properly. This assures that the cathode will be maintained at a proper level in the case.

There are several features in the support structure for the cathode 19 which are important. Air-depolarizing cathode bodies of carbonaceous material are typically quite fragile and easily abraded. It is important therefore that these cathode bodies be supported firmly and uniformly in the case to avoid possible cracking during transportation, handling and uses wherein the battery may be subjected to impacts and vibration. To assure such firm uniform support, any possible rubbing contact of the cathode with its support structure is to be avoided. Such avoidance is realized in the present structure by firmly securing an intermediary support member—the strap 25—to the cathode body and providing a lower detachable support 28 which engages only the intermediary member. The inverted V shape of the lower portion of the strap 25 is a feature which facilitates mounting the cathode on the support 28 since it guides the groove 27 into engagement with the cross member of this support as the cathode body is lowered into the case. As a further feature, the strap 25 is utilized as a positive low-resistance terminal to which a current conductor or lead 31 is connected as by means of one of the bolts 26.

Positioned at opposite sides of the cathode 19 are zinc anodes 32 and 33 which are similar in shape except for a truncation at 32a of a corner portion of the left anode 32 to provide a clearance below the filler opening 30 for a cell-filling structure hereinafter described. These anodes are supported by extending lugs 34 at the ends which seat on the bottom walls of internal grooves 35 provided in the end walls of the case. The right anode 33 of the right cell is connected by a lead wire 36 to a terminal 37 which is mounted on the top rim of the right wall of the case, the lead wire passing through a slot 17a in the rim 17 of the lid (Figure 2). This same lead wire extends lengthwise through a groove 38 in the right anode 33 and is secured to the anode throughout the length of this groove by soldering. To interconnect electrically the two anodes 32 and 33, the end portion 36a of the same lead wire is looped across to the left anode 32 whereat it extends upwardly throughout the length of a vertical groove 39 in this anode and is secured thereto again as by soldering. While only one such interconnection is shown between the two anodes of each cell in the figures, it will be understood that any number of interconnecting leads may be provided. The lead 31 which is connected to the cathode 19 of the rightward cell extends upwardly through a slot 17b in the rim of the lid and is connected at 40 to the lead 36 which connects to the anodes of the leftward one of the two cells. The connection 40 is disposed in the channel space between the lids 15 of the two cells and is wholly encased by the sealing compound 18. The lead 31 of the leftward cell—which is the lead connected to the cathode of the cell—is connected to a terminal 41 mounted on the top rim of the left wall of the battery case. The two terminals 37 and 41 are therefore the negative and positive poles respectively of the battery.

In accordance with the aforementioned Patent No. 2,450,472, a higher capacity per unit volume is obtained by filling each cell with granular lime or other electrolyte-regenerating material, for instance, different magnesium compounds, zeolite or bentonite, such as will combine with zincates in an alkaline solution to free the electrolyte which has been consumed by combination with the zinc anode. Within this granular mass is contained electrolyte solution. In the battery herein described, this solution is a caustic alkali, preferably caustic soda. The cell is filled with this granular mass 50 preferably to a level between the zinc anodes and the lid 15. To confine the granular mass in the space below this level, in the event the cell should be tipped or upset, there is provided a barrier 42. This barrier fits closely the side walls of the cell and has a central opening the edge of which fits closely the cathode 19 and the locating tab 26a to provide a substantially closed compartment in the cell above the granular mass 50. The barrier is however to be pervious to water and caustic alkali solutions. Preferably it is made of a heavy grade of paper formed with upturned edges which lie adjacent the side walls of the cells and terminate just short of the lid 15. As will appear, this barrier defines a free liquid space, unoccupied by any of the granular mass, for the upper portion of the electrolyte solution.

Primary cells, and particularly those of the air-depolarizing type, are commonly shipped and stored in an inactivated state to preserve the elements at their initial full-capacity condition until the battery is to be put into use. However, to enable safe and convenient activation by users in the field, the batteries are initially supplied with the electrolyte ingredient in a dry state so that only water has to be added to condition the cell for use. In the present type of cell wherein the preponderant space in the cell is filled with the granular mass 50, the dry electrolyte ingredient is provided also in granular form and is mixed uniformly with the regenerating material, this aggregate of electrolyte-regenerating and water-soluble electrolyte materials being herein referred to as the granular mix 50. When water is added, it flows readily through the mix and dissolves out the granules of electrolyte ingredient to activate the cell almost immediately.

It has been found that the water must be added in such a manner that the water-soluble electrolyte ingredient in the upper regions of the mix is not washed down into the lower regions. If such washdown should occur it would result in permanent depletion of the electrolyte solution in the upper regions and might even incapacitate the cell for the purpose at hand. In fact, it is desirable that the solution strength be, initially, even greater in the upper regions than in the lower regions since such non-uniformity is self-correcting by the action of gravity and is insurance that the upper regions will have adequate solution strength for efficient operation of the cell. The avoidance of washdown of electrolyte ingredient in the granular mass 50 is accomplished in accordance with the present invention by the use of a special filling apparatus herein next described.

Depending from the filler opening 30 in the lid 15 to the bottom of the cell is a filler tube 43 which extends vertically through the entire granular mix 50 and which is made preferably of a material substantially impervious to liquid. It is to provide clearance space for this filler tube that the cathode and anodes are truncated in the manner hereinbefore explained. The lower end portion of the tube engages an annular locating rib 10a on the bottom wall of the case to hold the tube in place. Near the lower end of the tube there is an outlet 44 for egress of water which is added to the tube by way of the filler opening. This outlet 44 may be simply a single opening covered by a screen 45, which is wrapped around the tube, to prevent ingress of the adjacent granules of the mix. Alternatively, the opening 44 and screen 45 may be omitted, and the tube may have a loose fit on the rib 10a to allow water egress directly out of the end of the tube into the granular mix.

A gas vent is afforded by providing a clearance space between the filler tube and the neck of the filler opening 30. Preferably, the filler opening is provided with internal ribs 46 (Figure 1) to space the tube evenly therefrom and form a substantially annular vent between the tube and filler opening. However, to prevent ingress of water into the vent during filling, the filler tube is made at least as high as the top edge of the filler opening.

As water is added to the filler tube, it passes through the outlet 44 at the bottom of the granular mix 50 and rises as an ascending column through the mix to fill all the air space therein. The electrolye granules are not merely dissolved in situ, but because of the rising water column there is some upward washing or displacement to effect an even stronger solution in the upper regions than is obtained in the lower regions at the end of a filling operation. Although it is known that a filler tube reaching to the bottom of a cell has been heretofore used in primary batteries, it is not known that such a tube having a principal outlet at the bottom has been employed with a granular mix containing a water-soluble ingredient to prevent washdown of that ingredient as the cell is activated.

Each cell is filled with water to a level about half the way up the skirt 16 of the lid 15. After filling, the battery will become warm and the level will rise somewhat higher, but as the battery cools the solution recedes to a level between the flange 21 surrounding the cathode 19 and the barrier 42. Thus, a layer of electrolyte solution free of solids is provided above the granular mix in a region of the cell where the internal cross section of the case is a maximum. In this way, changes in the solution volume, in service, have a minimum effect on the solution level. This stabilizing influence on the solution level is an aid to the user in maintaining the cell in service.

Notwithstanding that the filling action is such as to provide an initial solution strength in the upper regions which is equal to or greater than the average strength, it is desirable to provide some dry electrolyte ingredient in the space above the barrier 42 where there would otherwise be no supply directly available. This additional ingredient may be in granular form, the same as that distributed through the mix 50 below the barrier, or may be in one or more solid pieces. By way of example, two cylindrical rods 47 of dry electrolyte ingredient are provided for each cell, one at each side of the cathode 19. The height of the granular mix 50 in the cell may be selected at any desired level for the purposes of different features of the present invention. Preferably, the cell is filled with this mix to a level above the anodes in order to obtain a maximum ampere-hour capacity. If the cell is filled with the mix to a somewhat lower level, the cell capacity is reduced but there is a slight reduction in internal resistance. The height of the mix may depend therefore upon the specific battery performance desired. In any event, the normal solution level is to be above the top of the granular mix in order that the solution level will be as stable as possible to ease maintenance requirements and to give maximum uniformity of performance in the field.

In the upper portion of the filler tube above the anodes 32 and 33, and preferably above the barrier 42, there is an outlet 43 as in the form of a narrow slit. Particularly, if this outlet is extended below the top level of the granular mix, it may be covered by a screen 49 wrapped around the tube, or may have a size smaller than the granules of the mix, so that the granules may not flow into the tube. This is a minor outlet compared to the outlet 44 at the bottom of the tube, and is adapted to fulfil several special functions. Being relatively small, this minor outet does not allow any appreciable amount of the water added to the tube to escape therethrough during a normal filling operation. However, near the end of a filling operation, as when the water has risen to the level of the minor outlet 48, a further addition of water will, in part, seep out laterally through the minor outlet. Thus, the minor outlet permits the battery to be filled to a desired level. In the absence of this minor outlet, the clear water in the tube tends to overstand the enriched solution outside the tube, by reason of difference of specific gravity, to such an extent as to result in overflow at the water entrance prior to attainment of desired solution level in the battery proper. Additionally, the equalizing action of the minor outlet provides a means for making a reliable observation of the liquid level in the battery proper by inspecting the level in the tube. Still in addition, this minor outlet near the top of the tube permits a final addition of oil to seep out laterally and float on the battery solution in contrast to being retained in the tube, the purpose of such oil when used being to seal the solution from contact with the air for reasons well known in the art.

Since the two cells shown in the drawings are identical, a description of one serves for both and identical reference numerals are used for corresponding elements.

The embodiment of my invention herein particularly shown and described is intended to be illustrative and not limitative of my invention, since the same is subject to changes and modifications without departure from the scope of my invention, which I endeavor to express according to the following claims. In the claims, the term "tube" is used to mean any hollow conduit of whatever shape in cross section.

I claim:

1. In a primary cell of the water-activatable deferred-action type comprising a case provided with a filler opening: the combination of cathode and anode elements in said case; a dry granular mix of water-soluble electrolyte ingredient and electrolyte-regenerating material filling said case to a predetermined level; a filler tube extending downwardly from said opening to the bottom of said case, said tube being impervious throughout the height of said mix and having an outlet at its lower end for directing water, which is added to the cell through said opening, to the bottom of said mix; a water-pervious barrier at said level for confining said mix to the lower portion of the case; and a mass of dry water-soluble electrolyte ingredient in said case above said barrier.

2. The combination set forth in claim 1 wherein said tube has a major outlet at the bottom for egress of water to said mix, and has a minor outlet above said barrier for egress of water to the space above the barrier after the air space below the barrier is filled with water, and wherein the portion of said tube between said two outlets is substantially liquid-impervious.

3. In a primary cell of the water-activatable deferred-action type comprising a case provided with a filler opening: the combination of cathode and anode elements in said case; a dry granular mix of water-soluble electrolyte ingredient and electrolyte-regenerating material filling said case to a predetermined level; a water-pervious barrier at said level for confining said mix to the lower portion of said case; a filler tube extending downwardly from said opening to the lower part of said case, said tube having a major outlet at the bottom for egress of water, which is poured into said filler opening, to said mix until the water in the mix has risen to a level adjacent to said barrier, and said tube having a minor outlet adjacent to said barrier for egress of water to upper regions of the cell after the air space below the minor opening is filled.

4. In a primary cell of the air-depolarized type including a case: the combination of a cross rod in said case at a distance from the bottom thereof; a cathode body of carbonaceous material in said case; and a U-shaped metal strap embracing the lower portion of said cathode body and secured firmly thereto, the lower portion of said strap bridging the bottom face of said cathode having an inverted-V shape substantially wider than the width of said rod and engaging said cross rod at the apex of said V-shaped portion to support said cathode vertically within said case.

5. The combination set forth in claim 4 wherein said V-shaped lower portion of said strap is provided with a groove at the apex thereof for receiving said cross rod, said inverted-V portion being adapted to guide said groove into engagement with said cross rod as said cathode is lowered into the case.

6. In a primary cell of the water-activatable deferred-action type comprising a case provided with a filler opening: the combination of cathode and anode elements in said case; an active granular mass comprising water-soluble electrolyte ingredient filling said case to a level near the top thereof; a water-pervious barrier at the top of said granular mass; a filler tube extending downwardly from said opening to the bottom of said granular mass, said tube having a major outlet at the bottom thereof for egress of liquid, which is poured into said filler opening, to said granular mass until the liquid rises to said barrier, and said tube having a minor outlet above said barrier for egress of liquid to the upper region of the cell after the air space below said barrier is filled.

7. In a primary cell of the water-activatable deferred-action type comprising a case provided with a filler opening: the combination of cathode and anode elements in said case; a dry, granular mix of water-soluble electrolyte ingredient and electrolyte-regenerating material filling said case to a predetermined level; a water-pervious barrier at said level for confining said mix therebelow; and a filling tube extending downwardly from said filler opening to the bottom of said case, said tube having a major outlet at the bottom for egress of water to said mix, and said tube further having a minor side opening in its upper portion above said barrier for equalizing the liquid level inside and outside the tube at the end of a filling operation.

LE ROY S. DUNHAM.

(References on following page)

References Cited in the file of this patent

UNITED STATES PATENTS

| Number | Name | Date |
|---|---|---|
| 618,057 | Crowdus | Jan. 24, 1899 |
| 710,278 | Klinker et al. | Sept. 30, 1902 |
| 778,912 | Stockigt | Jan. 3, 1905 |
| 933,525 | Brodie | Sept. 7, 1909 |
| 1,284,458 | Rollinson | Nov. 12, 1918 |
| 1,317,139 | Landau | Sept. 23, 1919 |
| 2,051,987 | Domizi | Aug. 25, 1936 |
| 2,207,734 | Heise et al. | July 16, 1940 |
| 2,213,429 | Heise et al. | Sept. 3, 1940 |
| 2,450,472 | Dunham et al. | Oct. 5, 1948 |

FOREIGN PATENTS

| Number | Country | Date |
|---|---|---|
| 201,068 | Germany | Mar. 15, 1907 |
| 14,883 | Denmark | Oct. 14, 1910 |
| 383,297 | Great Britain | Nov. 17, 1932 |
| 383,529 | Great Britain | Nov. 17, 1932 |
| 839,800 | France | Apr. 12, 1939 |
| 529,394 | Great Britain | Nov. 20, 1940 |